US009416055B2

(12) United States Patent
Gasgnier et al.

(10) Patent No.: US 9,416,055 B2
(45) Date of Patent: Aug. 16, 2016

(54) CERAMIC COMPOSITIONS COMPRISING ALUMINA

(71) Applicant: IMERYS CERAMICS FRANCE, Paris (FR)

(72) Inventors: Gilles Gasgnier, Isle (FR); Wen Zhang, Limoges (FR)

(73) Assignee: Imerys Ceramics France, Paris (FR)

( * ) Notice: Subject to any disclaimer, the term of this patent is extended or adjusted under 35 U.S.C. 154(b) by 0 days.

(21) Appl. No.: 14/408,274

(22) PCT Filed: Jun. 21, 2013

(86) PCT No.: PCT/EP2013/063048
§ 371 (c)(1),
(2) Date: Dec. 15, 2014

(87) PCT Pub. No.: WO2013/190115
PCT Pub. Date: Dec. 27, 2013

(65) Prior Publication Data
US 2015/0119230 A1    Apr. 30, 2015

(30) Foreign Application Priority Data
Jun. 22, 2012 (EP) .................... 12290205

(51) Int. Cl.
C04B 35/111 (2006.01)
C04B 35/117 (2006.01)
F41H 5/00 (2006.01)
C04B 35/101 (2006.01)
C04B 35/103 (2006.01)
C04B 35/106 (2006.01)
C04B 35/626 (2006.01)
C04B 35/645 (2006.01)
F41H 5/04 (2006.01)
C04B 35/64 (2006.01)

(52) U.S. Cl.
CPC ............ *C04B 35/101* (2013.01); *C04B 35/103* (2013.01); *C04B 35/106* (2013.01); *C04B 35/117* (2013.01); *C04B 35/6261* (2013.01); *C04B 35/62655* (2013.01); *C04B 35/62665* (2013.01); *C04B 35/62685* (2013.01); *C04B 35/64* (2013.01); *C04B 35/6455* (2013.01); *F41H 5/0414* (2013.01); *C04B 2235/3206* (2013.01); *C04B 2235/3208* (2013.01); *C04B 2235/3217* (2013.01); *C04B 2235/3244* (2013.01); *C04B 2235/386* (2013.01); *C04B 2235/3821* (2013.01); *C04B 2235/3826* (2013.01); *C04B 2235/3843* (2013.01); *C04B 2235/3847* (2013.01); *C04B 2235/427* (2013.01); *C04B 2235/52* (2013.01); *C04B 2235/5418* (2013.01); *C04B 2235/5427* (2013.01); *C04B 2235/5436* (2013.01); *C04B 2235/6021* (2013.01); *C04B 2235/6022* (2013.01); *C04B 2235/6025* (2013.01); *C04B 2235/6027* (2013.01); *C04B 2235/6567* (2013.01); *C04B 2235/72* (2013.01); *C04B 2235/77* (2013.01); *C04B 2235/783* (2013.01); *C04B 2235/96* (2013.01); *Y10T 428/2982* (2015.01)

(58) Field of Classification Search
CPC .... C04B 35/117; C04B 35/119; F41H 5/0414
See application file for complete search history.

(56) References Cited

U.S. PATENT DOCUMENTS

| 5,512,523 | A | | 4/1996 | Ono et al. | |
|---|---|---|---|---|---|
| 5,932,506 | A | * | 8/1999 | Bogan | ................... C04B 35/103 501/100 |
| 6,624,106 | B2 | * | 9/2003 | Cohen | ................... C04B 35/111 2/2.5 |
| 6,656,570 | B1 | | 12/2003 | Fels et al. | |
| 7,456,122 | B2 | | 11/2008 | Rhodes et al. | |
| 7,866,248 | B2 | | 1/2011 | Moore, III et al. | |
| 2002/0037800 | A1 | * | 3/2002 | Yang | ........................ B24C 5/04 501/87 |
| 2009/0221415 | A1 | | 9/2009 | Avedikian et al. | |
| 2010/0120605 | A1 | | 5/2010 | Kuntz et al. | |

FOREIGN PATENT DOCUMENTS

| JP | 2003252677 | * | 9/2003 |
|---|---|---|---|
| WO | WO 02/28980 | | 4/2002 |
| WO | WO 2013/190115 A1 | | 12/2013 |

OTHER PUBLICATIONS

Acchar, Wilson; Zollfrank, Cordt; and Greil, Peter; "Microstructure of alumina reinforced with tungsten carbide", J. Mater Sci., vol. 41, 2006, pp. 3299-3302.
Badmos, Adebayo Y.; and Ivey, Douglas, "Characterization of structural alumina ceramics used in ballistic armour and wear applications", Journal of Materials Science, vol. 36, 2001, pp. 4995-5005.
Bonded Abrasives, Tribacher Schleifmittel, Sep. 1996, 19 pgs.

(Continued)

*Primary Examiner* — Karl Group
(74) *Attorney, Agent, or Firm* — Finnegan, Henderson, Farabow, Garrett & Dunner LLP

(57) ABSTRACT

A composition suitable for firing to obtain a ceramic material therefrom may include from about 1 to about 40 wt. % based on the total dry weight of the composition a first particulate material having a Mohs hardness of at least about 8.5 and a $d_{50}$ of from about 7 μm to about 500 μm. The composition may include at least about 50 wt. % based on the total dry weight of the composition a second particulate material comprising alumina. The composition may include from 0 to about 10 wt. % based on the total dry weight of the composition a sintering aid. A green body or ceramic material may be formed from the composition. Ballistic armor may be formed from the composition or may include the ceramic material.

13 Claims, 5 Drawing Sheets

(56) References Cited

OTHER PUBLICATIONS

Ferguson, W. J.; and Rice, R. W., "Effect of Microstructure on the Ballistic Performance of Alumina", NRL Memorandum Report 2302, Navel Resesarch Library, Aug. 1971, 27 pgs.

Guzmán, A. M.; Rodriquez, P.; and Sereno, E., Development of AZS Refractories for the Glass Industry, The AZo Journal of Materials Online, vol. 2, Apr. 2006, 12 pgs.

Medvedovski, Eugene, "Alumina-mullite ceramics for structural applications", Ceramics International, vol. 32, 2006, pp. 369-375.

"Specialty Aluminas—Standard ceramics and tiles applications", Alcan Ceramics Brochure 2010, Rio Tinto Alcan, 12 pgs.

International Search Report and Written Opinion dated Aug. 27, 2013, for International Application No. PCT/EP2013/063048.

\* cited by examiner

FIGURE 2
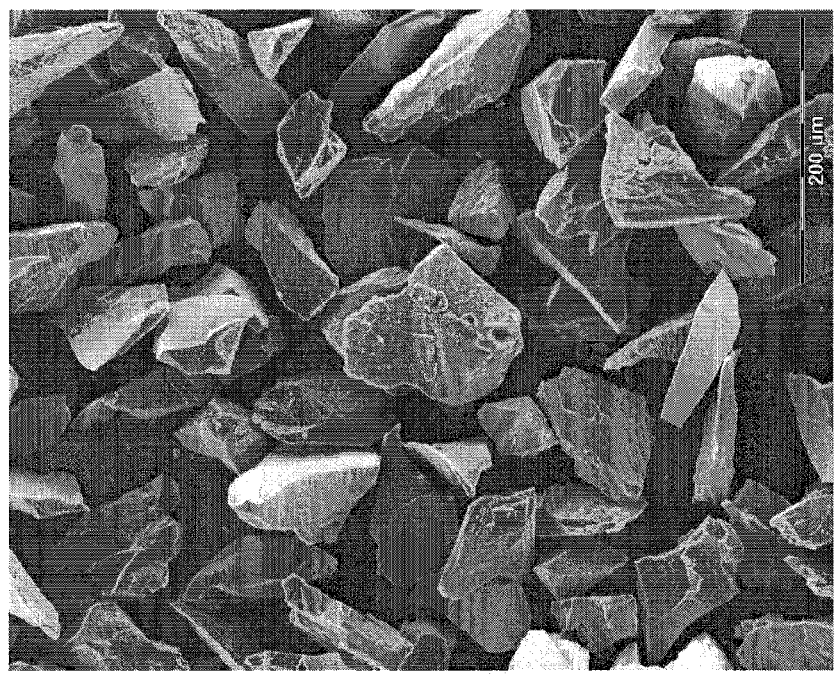
Figure 2(b)
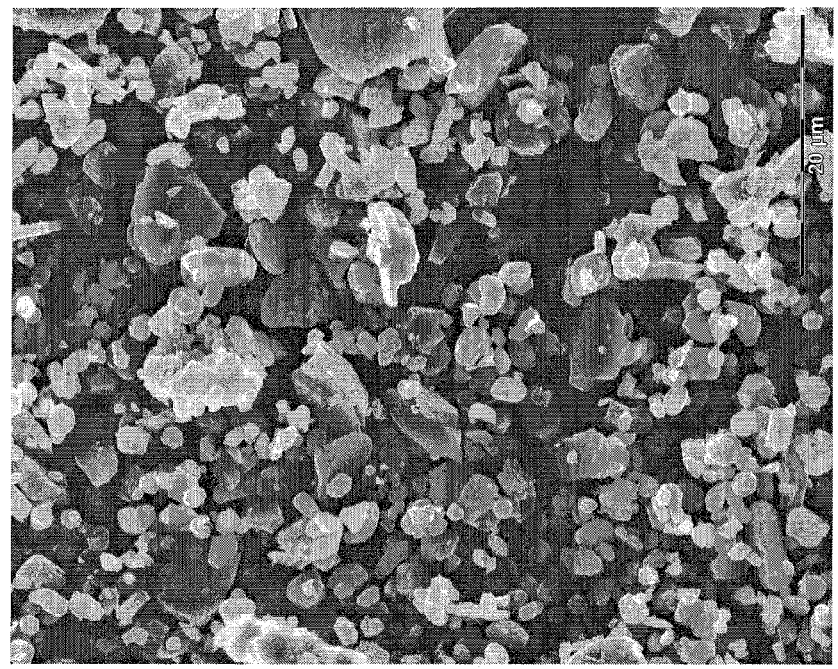
Figure 2(a)

US 9,416,055 B2

CERAMIC COMPOSITIONS COMPRISING ALUMINA

CLAIM FOR PRIORITY

This application is a U.S. national phase entry under 35 U.S.C. §371 from PCT International Application No. PCT/EP2013/063048, filed Jun. 21, 2013, which claims the benefit of priority of European Patent Application No. 12290205.9, filed Jun. 22, 2012, the subject matter of both of which is incorporated herein by reference.

TECHNICAL FIELD

The present application is directed to a composition suitable for forming and firing to obtain a ceramic material therefrom, to a green body formed from the composition, to a ceramic material formed from the composition or green body and to ballistic armour formed from or comprising the ceramic material.

BACKGROUND OF THE INVENTION

The development of new alumina-based ceramics for ballistic protection applications is ongoing. For example, Medvedovski describes the preparation of alumina-mullite and alumina-mullite-zirconia ceramic materials in *Ceramics International*, 32 (2006), pp 369-375. There is an ongoing need for further ceramic materials having physical properties suitable for ballistic protection applications.

SUMMARY OF THE INVENTION

According to a first aspect of the present invention, there is provided a composition suitable for forming and firing to obtain a ceramic material therefrom, said composition comprising:

(a) from about 1 to about 40 wt. % of a first particulate material (e.g., fused corundum, zirconia, silicon carbide, boron carbide, tungsten carbide, titanium carbide, boron nitride, diamond, and combinations thereof) having a Mohs hardness of at least about 8.5 and a $d_{50}$ from about 7 to about 500 µm;

(b) at least about 50 wt. % calcined alumina particulate other than fused corundum; and (c) from 0 to about 10 wt. % sintering aid;

wherein the amount of (a), (b) and (c) are based on the total dry weight of the composition.

According to a second aspect of the present invention, there is provided a green body formed from the composition of the first aspect of the present invention.

According to a third aspect of the present invention, there is provided a ceramic material obtainable by firing the green body of the second aspect of the present invention.

According to a fourth aspect of the present invention, there is provided ballistic armour formed from or comprising the ceramic material of the fourth aspect of the present invention.

According to a fifth aspect of the present invention, there is provided a method of making ceramic material according to claim 13, comprising:

(i) combining raw materials comprising alumina particulate, a particulate material having a Mohs hardness of at least about 8.5 and a $d_{50}$ of from about 7 to about 500 µm and optionally sintering aid(s) in appropriate amounts to form a mixture thereof;

(ii) forming a green body from the mixture; and (iii) firing the green body to form a ceramic material.

The alumina particulate may be milled for a period of time before the particulate material having a Mohs hardness of at least about 8.5 and a $d_{50}$ of from about 7 to about 500 µm is added, following which further milling is carried out for a period of time sufficient to homogenize the mixture.

According to a sixth aspect of the present invention, there is provided the use of a composition according to the first aspect of the present invention in the manufacture of ballistic armour.

BRIEF DESCRIPTION OF THE FIGURES

FIG. 2 is SEM images of the calcined alumina (FIG. 2(a)) and fused corundum (FIG. 2(b)) starting materials used in the Examples.

DETAILED DESCRIPTION

Composition Suitable for Forming and Firing

Figures 1, 1A, 1B, 1C:
FIG. 1 is scanning electron microscopy (SEM) images of various grain shapes, (a) angular; (b) pointed and angular; (c) cubic.

The composition of the first aspect of the present invention comprises from about 1 to about 40% by weight, based on the total dry weight of the composition, of first particulate material having a Mohs hardness of at least about 8.5 (e.g., fused corundum) and having a $d_{50}$ from about 7 µm to about 500 µm. In an embodiment, the $d_{50}$ is from about 9 µm to about 180 µm, or from about 17 µm to about 180 µm, or from about 23 µm to about 180 µm, or from about 23 µm to about 105 µm, or about 23 µm to about 75 µm, or from about 29 µm to about 125 µm, or from about 29 µm to about 105 µm, or about 29 µm to about 75 µm, or from about 29 µm to about 63 µm, or from about 37 µm to about 125 µm, or from about 37 µm to about 105 µm, or from about 37 µm to about 63 µm, or from about 45 µm to about 125 µm, or from about 40 µm to about 105 µm, or from about 40 to about 75 µm, or from about 40 to about 63 µm, or from about 53 µm to about 125 µm, or from about 53 µm to about 105 µm, or from about 53 µm to about 75 µm, or from about 53 µm to about 63 µm.

In certain embodiments, the first particulate material, e.g., fused corundum, may have a a Grit No. of from 800 to 60. For present purposes, Grit No. is determined in accordance with FEPA-Standard 42-GB-1984 (FEPA stands for Fédération Européenne des Fabricants de Produits Abrasifs). In an embodiment, the Grit No. is from 600 to 80, or from 400 to 80, or from 360 to 100, or from 360 to 120, or 360 to 150, or from 320 to 100, or from 320 to 120, or 320 to 150, or from 320 to 180, or from 280 to 100, or from 280 to 120, or from 280 to 180, or from 240 to 100, or from 240 to 120, or from 240 to 150, or from 240 to 180, or from 220 to 100, or from 220 to 120, or from 220 to 150, or from 220 to 180. In an embodiment, the first particulate material is fused corundum particulate and has a Grit No. of 100, or 120, or 150, or 180, or 220, or 240, or 280, or 320, or 360, or 400, or 600, or 800.

A correlation between Grit No. and sieve size (according to FEPA unless otherwise indicated) is presented in Table 1 below. A correlation between Grit No. and mean particle size (measured with an Eppendorf photometer) is presented in Table 2 below.

The composition of the first aspect of the invention may comprise from about 1 to about 35% by weight first particulate material, for example, from about 2 to about 35%, by weight, or from about 2 to about 30% by weight, or from about 3 to about 25% by weight, or from about 4 to about 20% by weight, or from about 5 to about 20% by weight, or from about 5 to about 18% by weight, or from about 5 to about 16% by weight, or from about 5 to about 14% by weight, or from about 5 to about 12% by weight, of from about 5 to about 10% by weight, or from about 6 to about 20% by weight, or from about 7 to about 20% by weight, or from about 8 to about 20% by weight, or from about 9 to about 20% by weight, or from about 10 to about 20% by weight first particulate material having any of the particle sizes (or Grit. Nos.) described above. In an embodiment, the composition of the first aspect of the invention may comprise about 1% by weight fused corundum particulate as a first particulate material, for example, about 2% by weight, or about 3% by weight, or about 4% by weight, or about 5% by weight, or about 6% by weight, or about 7% by weight, or about 8% by weight, or about 9% by weight, or about 10% by weight, or about 12% by weight, or about 14% by weight, or about 16% by weight, or about 18% by weight, or about 20% by weight of fused corundum particulate having any of the particle sizes (or Grit Nos.) described above.

In certain embodiments, the first particulate material has a Mohs hardness of at least about 8.6, or at least about 8.7, or at least about 8.8, or at least about 8.9, or at least about 9.0.

In certain embodiments, the first particulate material is selected from fused corundum, zirconia, silicon carbide, boron carbide, tungsten carbide, titanium carbide, boron nitride, diamond, and combinations thereof. For example, in certain embodiments, the first particulate material is fused corundum. Hereafter, the invention may tend to be discussed in terms of fused corundum, and in relation to aspects where the fused corundum is processed and/or treated. The invention should not be construed as being limited to such embodiments.

TABLE 1

| Grit | Sieve | | | Tol. |
|---|---|---|---|---|
| 4 | 1 | | 8000 | 0 |
| | 2 | 3½ | 5600 | <20 |
| | 3 | 4 | 4750 | >40 |
| | 3 + 4 | 5 | 4000 | >70 |
| | through | 6 | 3350 | <3 |
| 5 | 1 | | 6700 | 0 |
| | 2 | 4 | 4750 | <20 |
| | 3 | 5 | 4000 | >40 |
| | 3 + 4 | 6 | 3350 | >70 |
| | through | 7 | 2800 | <3 |
| 6 | 1 | 3½ | 5600 | 0 |
| | 2 | 5 | 4000 | <20 |
| | 3 | 6 | 3350 | >40 |
| | 3 + 4 | 7 | 2800 | >70 |
| | through | 8 | 2360 | <3 |
| 7 | 1 | 4 | 4750 | 0 |
| | 2 | 6 | 3350 | <20 |
| | 3 | 7 | 2800 | >40 |
| | 3 + 4 | 8 | 2360 | >70 |
| | through | 10 | 2000 | <3 |
| 8 | 1 | 5 | 4000 | 0 |
| | 2 | 7 | 2800 | <20 |
| | 3 | 8 | 2360 | >45 |
| | 3 + 4 | 10 | 2000 | >70 |
| | through | 12 | 1700 | <3 |

TABLE 1-continued

| Grit | Sieve | | | Tol. |
|---|---|---|---|---|
| 10 | 1 | 6 | 3350 | 0 |
| | 2 | 8 | 2360 | <20 |
| | 3 | 10 | 2000 | >45 |
| | 3 + 4 | 12 | 1700 | >70 |
| | through | 14 | 1400 | <3 |
| 12 | 1 | 7 | 2800 | 0 |
| | 2 | 10 | 2000 | <20 |
| | 3 | 12 | 1700 | >45 |
| | 3 + 4 | 14 | 1400 | >70 |
| | through | 16 | 1180 | <3 |
| 14 | 1 | 8 | 2360 | 0 |
| | 2 | 12 | 1700 | <20 |
| | 3 | 14 | 1400 | >45 |
| | 3 + 4 | 16 | 1180 | >70 |
| | through | 18 | 1000 | <3 |
| 16 | 1 | 10 | 2000 | 0 |
| | 2 | 14 | 1400 | <20 |
| | 3 | 16 | 1180 | >45 |
| | 3 + 4 | 18 | 1000 | >70 |
| | through | 20 | 850 | <3 |
| 20 | 1 | 12 | 1700 | 0 |
| | 2 | 16 | 1180 | <20 |
| | 3 | 18 | 1000 | >45 |
| | 3 + 4 | 20 | 850 | >70 |
| | through | 25 | 710 | <3 |
| 22 | 1 | 14 | 1400 | 0 |
| | 2 | 18 | 1000 | <20 |
| | 3 | 20 | 850 | >45 |
| | 3 + 4 | 25 | 710 | >70 |
| | through | 30 | 600 | <3 |
| 24 | 1 | 16 | 1180 | 0 |
| | 2 | 20 | 850 | <25 |
| | 3 | 25 | 710 | >45 |
| | 3 + 4 | 30 | 600 | >65 |
| | through | 35 | 500 | <3 |
| 30 | 1 | 18 | 1000 | 0 |
| | 2 | 25 | 710 | <25 |
| | 3 | 30 | 600 | >45 |
| | 3 + 4 | 35 | 500 | >65 |
| | through | 40 | 425 | <3 |
| 36 | 1 | 20 | 850 | 0 |
| | 2 | 30 | 600 | <25 |
| | 3 | 35 | 500 | >45 |
| | 3 + 4 | 40 | 425 | >65 |
| | through | 45 | 355 | <3 |
| 40 | 1 | 25 | 710 | 0 |
| | 2 | 35 | 500 | <30 |
| | 3 | 40 | 425 | >40 |
| | 3 + 4 | 45 | 355 | >65 |
| | through | 50 | 300 | <3 |
| 46 | 1 | 30 | 600 | 0 |
| | 2 | 40 | 425 | <30 |
| | 3 | 45 | 355 | >40 |
| | 3 + 4 | 50 | 300 | >65 |
| | through | 60 | 250 | <3 |
| 54 | 1 | 35 | 500 | 0 |
| | 2 | 45 | 355 | <30 |
| | 3 | 50 | 300 | >40 |
| | 3 + 4 | 60 | 250 | >65 |
| | through | 70 | 212 | <3 |
| 60 | 1 | 40 | 425 | 0 |
| | 2 | 50 | 300 | <30 |
| | 3 | 60 | 250 | >40 |
| | 3 + 4 | 70 | 212 | >65 |
| | through | 80 | 180 | <3 |
| 70 | 1 | 45 | 355 | 0 |
| | 2 | 60 | 250 | <25 |
| | 3 | 70 | 212 | >40 |
| | 3 + 4 | 80 | 180 | >65 |
| | through | 100 | 150 | <3 |
| 80 | 1 | 50 | 300 | 0 |
| | 2 | 70 | 212 | <25 |
| | 3 | 80 | 180 | >40 |
| | 3 + 4 | 100 | 150 | >65 |
| | through | 120 | 125 | <3 |

TABLE 1-continued

| Grit | Sieve | | | Tol. |
|---|---|---|---|---|
| 90 | 1 | 60 | 250 | 0 |
| | 2 | 80 | 180 | <20 |
| | 3 | 100 | 150 | >40 |
| | 3 + 4 | 120 | 125 | >65 |
| | through | 140 | 106 | <3 |
| 100 | 1 | 70 | 212 | 0 |
| | 2 | 100 | 150 | <20 |
| | 3 | 120 | 125 | >40 |
| | 3 + 4 | 140 | 106 | >65 |
| | through | 200 | 75 | <3 |
| 120 | 1 | 80 | 180 | 0 |
| | 2 | 120 | 125 | <20 |
| | 3 | 140 | 106 | >40 |
| | 3 + 4 | 170 | 90 | >65 |
| | through | 230 | 63 | <3 |
| 150 | 1 | 100 | 150 | 0 |
| | 2 | 140 | 106 | <15 |
| | 3 | 200 | 75 | >40 |
| | 3 + 4 | 230 | 63 | >65 |
| | through | 325 | 45 | <3 |
| 180 | 1 | 120 | 125 | 0 |
| | 2 | 170 | 90 | <15 |
| | 3 + 4 | 230 | 63 | >40 |
| | 3 + 4 + 5 | 270 | 53 | >65 |
| | through | 270 | 53 | — |
| 220 | 1 | 140 | 106 | 0 |
| | 2 | 200 | 75 | <15 |
| | 3 + 4 | 270 | 53 | >40 |
| | 3 + 4 + 5 | 325 | 45 | >60 |
| | through | 325 | 45 | — |
| 240 (ANSI) | 1 | 170 | 90 | 0 |
| | 2 | 200 | 75 | <5 |
| | 3 + 4 | 270 | 53 | >8 |
| | 3 + 4 + 5 | 325 | 45 | >38 |
| | through | 325 | 45 | — |

Fused corundum particulate suitable for use in the present invention may be prepared by the well known method of heating alumina in an arc furnace. During fusion alumina is transformed at temperatures of above about 2000° C. into a liquid state followed by cooling to produce fused corundum ingots. Following fusion and cooling, the ingots are ground and classified in sieving towers, typically arranged in cascade order. Sedimentation tanks may also be used for classification. The classified materials may then be subjected to additional refining steps to further modify the properties of the grain. Typically, the furnace consists of a water cooled steel shell and batches (e.g., up to about 20 tonnes) of material may be fused at any one time. The conditions in the arc furnace may be varied to produce different types of fused corundum, such as brown fused corundum, white fused corundum and pink fused corundum. The fused corundum has a high density, low porosity, low permeability and high refractoriness.

In certain embodiments, the fused corundum particulate of component (a) will have a hardness of about 9 Mohs and a specific gravity of at least about 3.9 g/cm$^3$. The fused corundum may have a bulk density in the range of from about 1.3 to about 2.0 g/cm$^3$, determined using the current FEPA test method, for example, from about 1.35 to about 1.90 g/cm$^3$, or from about 1.35 to about 1.85 g/cm$^3$, or from about 1.35 to about 1.80 g/cm$^3$, or from about 1.35 to about 1.75 g/cm$^3$, or from about 1.40 to about 1.75 g/cm$^3$, or from about 1.40 to about 1.70 g/cm$^3$, or from about 1.40 to about 1.65 g/cm$^3$, or from about 1.40 to about 1.60 g/cm$^3$, or from about 1.40 to about 1.55 g/cm$^3$, or from about 1.40 to about 1.50 g/cm$^3$.

TABLE 2

| Grit No. | Mean size ($d_{50}$) in μm |
|---|---|
| 12 | 2360 |
| 16 | 1190 |
| 24 | 710 |
| 36 | 500 |
| 46 | 355 |
| 60 | 250 |
| 80 | 180 |
| 100 | 125 |
| 120 | 105 |
| 150 | 75 |
| 180 | 63 |
| 220 | 53 |
| 240 | 45 |
| 280 | 37 |
| 320 | 29 |
| 360 | 23 |
| 400 | 17 |
| 600 | 9 |
| 800 | 7 |
| 1000 | 5 |
| 1200 | 3 |

In an advantageous embodiment, the morphology of the first particulate material (also referred to as grain shape) is 'angular' or 'pointed' or 'pointed and angular'. The grain shape may be determined by measuring the bulk density using the FEPA or ASTM method. Examples of first particulate materials (e.g., fused corundum) having an 'angular', 'pointed and angular', and 'cubic' grain shape are shown in FIGS. 1(a), (b) and (c), respectively. These are well known terms of art in this technical field and a person skilled in the art will be able to readily determine the difference between a 'cubic' particulate (grain shape) on the one hand and an 'angular' or 'pointed and angular' particulate (grain shape) on the other hand. In embodiments, the morphology of the first particulate material is a mixture of 'angular', 'pointed' and 'pointed and angular'.

In an embodiment, the first particulate material is white fused corundum, for example, white fused corundum having an $Al_2O_3$ content of at least about 99%, an $Fe_2O_3$ content of less than about 0.05%, and a $Na_2O$ content of less than about 0.20%. In another embodiment, the first particulate material is brown fused corundum, for example, brown fused corundum having an $Al_2O_3$ content of between about 95% and 98%, a $TiO_2$ content of at least about 1.5% and an $Fe_2O_3$ content of at least about 0.10%. In another embodiment, the first particulate material is pink fused corundum, for example, pink fused corundum having an $Al_2O_3$ content of at least about 99% and a $CrO_2$ content of about at least about 0.2%. In a further embodiment, the first particulate material is a mixture of two or more of white, brown and pink fused corundum, for example, a mixture of white and brown fused corundum.

Component (b) is a second particulate material comprising alumina. In certain embodiments, the second particulate material consists of, or consists essentially of, calcined alumina particulate. In such embodiments, the calcined alumina particulate is not a fused corundum. Hereafter, the invention may tend to be discussed in terms of calcined alumina particulate, and in relation to aspects where the calcined alumina particulate is processed and/or treated. The invention should not be construed as being limited to such embodiments.

In one embodiment, the calcined alumina is prepared by heating aluminium hydroxide (e.g., bauxite) at a sufficient temperature (e.g., above about 1100° C.) to form α-alumina. In another embodiment, the calcined alumina is prepared by use of the Bayer process and heating under pressure.

The second particulate material, for example, calcined alumina particulate, is present in an amount of at least about 50% by weight, based on the total dry weight of the composition. In an embodiment, calcined alumina particulate other than component (a) is present in an amount of at least about 60% by weight, based on the total dry weight of the composition, for example, at least about 65% by weight, or at least about 70% by weight, or at least about 75% by weight, or at least about 80% by weight, or at least about 82% by weight, or at least about 84% by weight, or at least about 86% by weight, or at least about 88% by weight, or at least about 90% by weight, or at least about 91% by weight, or at least about 92% by weight, or at least about 93% by weight, or at least about 94% by weight, or at least about 95% by weight, or at least about 96% by weight, or at least about 97% by weight or at least about 98% by weight calcined alumina particulate other than component (a). In an embodiment, the composition of the first aspect of the present invention comprises no more than about 99% by weight calcined alumina particulate other than component (a).

In an embodiment, the calcined alumina particulate other than component (a) has a $d_{50}$ of from about 0.1 to about 20 µm, for example, a $d_{50}$ of from about 0.5 to about 15 µm, or from about 1 to about 15 µm, or from about 2 to about 12 µm, or from about 2 to about 10 µm, or from about 3 to about 8 µm, or from about 2 to about 6 µm, or from about 3 to about 6 µm, or from about 2 to about 5 µm, or from about 3 to about 5 µm, or from about 4 to about 10 µm, or from about 4 to about 8 µm, or from about 4 about 6 µm. In an embodiment, the calcined alumina particulate has a $d_{50}$ of about 1 µm, or about 2 µm, or about 3 µm, or about 4 µm, or about 5 µm, or about 6 µm, or about 7 µm, or about 8 µm, or about 9 µm, or about 10 µm. The calcined alumina particulate may have a $d_{90}$ of less than about 40 µm, for example, less than about 30 µm, or less than about 25 µm, or less than about 20 µm, or less than about 15 µm, or less than about 10 µm.

Unless otherwise stated, the mean (average) equivalent particle diameter ($d_{50}$ value) referred to herein is as measured in a well known manner by sedimentation of the particulate material in a fully dispersed condition in an aqueous medium using a Sedigraph 5100 machine as supplied by Micromeritics Instruments Corporation, Norcross, Ga., USA (web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (esd), less than given esd values. The mean particle size $d_{50}$ is the value determined in this way of the particle esd at which there are 50% by weight of the particles which have an equivalent spherical diameter less than that $d_{50}$ value. Likewise, $d_{90}$ is the value determined in this way of the particle esd at which there are 90% by weight of the particles which have an equivalent spherical diameter less than that $d_{90}$ value.

The calcined alumina particulate may have an $Al_2O_3$ content of at least 99%, a $Na_2O$ content of less than about 0.4% and a $Fe_2O_3$ content of less than about 0.015%. In an embodiment, the calcined aluminate particulate is a medium soda alumina having a $Na_2O$ content of from about 0.15 to about 0.30%. In another embodiment, the calcined alumina particulate is a low soda alumina having a $Na_2O$ content of less than about 0.15%.

In an embodiment, the weight ratio of component (a) to component (b) is from about 1:99 to about 4:5, for example, from about 2:98 to about 1:2.5, or from about 3:97 to about 1:3, or from about 4:96 to about 1:4, or from about 5:95 to about 3:17, or from about 5:95 to about 1:9.

In one embodiment, the composition of the first aspect consists of or consists essentially of, (a) first particulate material (e.g., fused corundum) having a Mohs hardness of at least about 8.5 and a $d_{50}$ of from about 7 µm to about 500 µm, and (b) calcined alumina particulate other than fused corundum.

The composition of the first aspect of the invention may comprise an amount of sintering aid. For example, the composition of the first aspect of the invention may comprise from about 0.1% to about 10% by weight of sintering aid, based on the total dry weight of the composition. In embodiments, the composition comprises from about 0.5 to about 8.0% by weight of sintering aid, for example, from about 0.5% to about 6.0% by weight, from about 0.5% to about 5.0% by weight, from about 0.5% to about 4.0% by weight, from about 0.5% to about 3.0% by weight, or from about 0.5% to about 2.0% by weight, or from about 0.5% to about 1.5% by weight, or from about 0.1% to about 1.5% by weight, or from about 0.3% to about 1.0% by weight, or from about 0.5% to about 1.0% by weight of sintering aid.

Suitable sintering aids will be readily apparent to those skilled in the art. Exemplary sintering aids include alkali and alkali earth metal oxides such as, for example, magnesium oxide, sodium oxide (soda) and mixtures thereof.

In embodiments, the composition of the first aspect may be in the form of a powder, mouldable mixture or slurry. In certain embodiments, it will be a ready-to-press powder. By "ready-to-press" is meant a powder which is of a form suitable for pressing and which does not require any additional beneficiation, classification, sizing or other processing prior to pressing. Preparation of the composition is described in detail below (in accordance with the fifth aspect of the present invention).

In accordance with the second aspect of the present invention, the composition of the first aspect of the present invention, optionally in the form of a ready-to-press powder, is formed into a green body, optionally by pressing the composition. By "green" is meant a body in an unfired state. Details of forming are described below (in accordance with the fifth aspect of the present invention).

The body may have any suitable form. For example, the body may be in the form of a plate, panel or brick, and the like, sphere, cylinder, or a complex shape. The plate or panel may be planar, or non-planar, i.e., curved to some degree. The plate or panel may have a thickness ranging from about 1 mm to about 50 mm, for example, from about 5 mm to about 40 mm, for example, from about 5 to about 30 mm, or from about 5 to about 20 mm, or form about 5 to about 10 mm. The thickness (i.e., cross-section) may be uniform across the plate or panel may vary across the plate or panel. The plate or panel may be regular in shape, e.g., circular, ovular, triangular, square, rectangular, etc, or irregular in shape. The shape may be sized to fit, engage or otherwise cooperate with another article, for example, an article formed from or comprising one or more materials suitable for use in or as ballistic armour.

Ceramic Material

The ceramic material according to the third aspect of the present invention is obtainable by firing the green body of the second aspect of the present invention. Details of the firing process are described below (in accordance with the fifth aspect of the present invention).

The ceramic material of the present invention may be characterized by having 'islands' of relatively large, irregular shape grains surrounded by smaller, more regular shaped grains. This effect can be seen by comparing the SEM images in FIG. 4, which are SEM images of an exemplary ceramic material of the present invention prepared with (FIG. 4(b)) and without FIG. 4(a) fused corundum.

Whilst not wishing to be bound by theory, it is believed that the presence of the much larger fused corundum particles in the pressed green body induces growth during firing of much larger, irregular shaped grains in the ceramic material compared to a ceramic material prepared in the absence of fused corundum according to component (b) of the composition of the first aspect of the present invention.

Further, it has unexpectedly been found that the presence of these larger and generally irregular shaped grains, which has the effect of increasing average grain size, in certain embodiments leads to improved ballistic performance (e.g., reduced depth of penetration). This is surprising because, according to the Hall-Petch relationship, hardness is expected to decrease with an increase in grain size.

Thus, in an embodiment, the ceramic material according to the third aspect of the present invention is characterized in having islands of grains having a grain size of at least about 40 µm. Grain size may be determined by visual inspection of an SEM of a ceramic material. Grain size is taken to be the maximum (straight line) dimension between grain boundaries of an individual grain as shown in an SEM image of the grain. In certain embodiments, on average, in any given 100 µm by 100 µm area (i.e., a 100 µm by 100 µm square) of ceramic material according to the third aspect of the present invention, there is at least 1 grain having a grain size of at least about 40 um, for example, at least about 50 µm, or least about 60 µm, or at least about 70 µm, or at least about 80 µm. For example, there may be at least 2, for example, at least 4, or at least 6, or least 8 grains, or at least 10 grains, or at least 12 grains, or at least 14 grains, or at least 20 grains having a grain size of at least about 40 µm, or at least about 50 µm, or at least about 60 µm, or at least about 70 µm, or at least about 80 µm. In an embodiment, the grain size of the largest grain(s) is less than about 150 µm, for example, less than about 140 µm, or less than about 130 µm, or less than about 120 µm, or less than about 110 µm, or less than about 100 µm. In certain embodiment, there are no more than 30 grains having a grain size of at least about 40 µm, or at least about 50 µm, or at least about 60 µm, or at least about 70 µm, or at least about 80 µm.

In certain embodiments, the ceramic material comprises relatively small and large grains, in which the size ratio of the small grains to large grains is at least about 1:2, for example, at least about 1:3, or at least about 1:4, or at least about 1:5. By 'small' is meant a grain size of less than about 40 um, for example less than about 35 um, or less than about 30 um, or less than about 25 um, or less than about 20 um, or less than about 15 um, or less than about 10 um. By 'large' is meant a grain size of at least about 40 um, for example, at least about 50 µm, or least about 60 µm, or at least about 70 µm, or at least about 80 µm. Grain size may be determined in accordance with the method described above.

In certain embodiments, in any given area of ceramic material, the ratio (i.e., quantity) of small grains to large grains is at least about 50:50, for example, at least about 60:40, or at least about 70:30, or at least about 80:20, or at least about 90:10, or at least about 95:5, or at least about 96:4, or at least about 97:3, or at least about 98:2, or at least about 99:1.

In another embodiment, the ceramic material of the third aspect has a Knoop hardness which is at least about 1% greater than the Knoop hardness of a comparable ceramic material prepared from a green body which does not comprise first particulate material having a Mohs hardness of at least about 8.5 and a $d_{50}$ of from about 7 µm to about 500 µm according the first aspect of the present invention, as determined in accordance with ASTM E384. For example, the ceramic material of the third aspect of the present invention may have a Knoop hardness which is at least about 2% greater, or at least about 3% greater, or at least about 4% greater, or at least about 5 greater, or at least about 6% greater, or at least about 7% greater, or at least about 8% greater, or at least about 9% greater, or at least about 10% greater than the Knoop hardness of a comparable ceramic material prepared from a green body which does not comprise first particulate material having a Mohs hardness of at least about 8.5 and a $d_{50}$ of from about 7 µm to about 500 µm according the first aspect of the present invention.

The ceramic material may a Knoop hardness of at least about 1800 kg/cm$^2$, for example, at least about 1825 kg/cm$^2$, or at least about 1850 kg/cm$^2$, or at least about 1875 kg/cm$^2$, or at least about 1900 kg/cm$^2$, or at least about 1925 kg/cm$^2$, or at least about 1950 kg/cm$^2$, or at least about 1975 kg/cm$^2$, or at least about 2000 kg/cm$^2$.

The ceramic material may have a density in the range of from about 3.0 to about 4.0 g/cm$^3$, for example, at least about 3.5 g/cm$^3$, or at least about 3.6 g/cm$^3$, at least about 3.7 g/cm$^3$, or at least about 3.75 g/cm$^3$.

The ceramic material may have a 3-point bending strength of at least about 250 MPa, or at least about 260 MPa, or at least about 265 MPa, or at least about 270 MPa, or at least about 275 MPa, or at least about 280 MPa, or at least about 285 MPa, or at least about 290 MPa, or at least about 295 MPa, or at least about 300 MPa. The ceramic material may have 3-point bending strength of no greater than about 400 MPa, for example, no greater than about 350 MPa.

The ceramic material may have a modulus of elasticity in the range of from about 200 to about 400 GPa, for example, from about 250 to about 400 GPa, or from about 300 to about 400 GPa, or from about 300 to 350 GPa.

The ceramic material may have a porosity (open) of less than about 5%, or less than about 4%, or less than about 3%, or less than about 2%, or less than about 1%, or less than about 0.8%, or less than about 0.6%, or less than about 0.5%, or less than about 0.45%, or less than about 0.40%, or less than about 0.39%, or less than about 0.38%, or less than about 0.37%, or less than about 0.36%, or less than about 0.35%, or less than about 0.34%, or less than about 0.33%, or less than about 0.32%, or less than about 0.31%. The ceramic material may have a porosity (open) of greater than about 0.25%, for example, greater than about 0.26%, or greater than about 0.27%, or greater than about 0.28%, or greater than about 0.29%, or greater than about 0.30%.

The ceramic material may be in the form of a plate, panel or brick, and the like, cylinder, sphere or a complex shape. The plate or panel may be planar, or non-planar, i.e., curved to some degree. The plate or panel may have a thickness ranging from about 1 mm to about 50 mm, for example, from about 5 mm to about 40 mm, for example, from about 5 to about 30 mm, or from about 5 to about 20 mm, or form about 5 to about 10 mm. The thickness (i.e., cross-section) may be uniform across the plate or panel may vary across the plate or panel. The plate or panel may be regular in shape, e.g., circular, ovular, triangular, square, rectangular, etc, or irregular in shape. The shape may be sized to fit, engage or otherwise cooperate with another article, for example, an article formed from or comprising one or more materials suitable for use in or as ballistic armour.

Complex shapes include components for use in aerospace, biomedical, electronic, optical, industrial and automotive applications, e.g., shielding parts and tiles, artificial bones and biodegradable splints, insulators, switches, gas turbine parts, etc., and the like.

Ballistic Armour

According to a fourth aspect of the present invention, there is provided ballistic armour formed from or comprising the ceramic material of the fourth aspect of the present invention. The armour may be in the form of body armour, for example, a bullet proof or ballistic vest. Such vests may comprise one or more ceramic bodies, such as plates, spheres or cylinders, such as small arms protective inserts used by the military, formed from or comprising the ceramic material of the fourth aspect of the present invention.

The ballistic armour may further comprise one or more materials suitable for use in or as ballistic armour such as, for example, silicon carbide, boron carbide and kevlar.

In another embodiment, the ballistic armour is used to protect cockpits of commercial or military airplanes, or to protect vehicles for domestic use, such as limousines, or to protect military vehicles, such as tanks and troop carriers.

Preparative Methods

In accordance with the fifth aspect of the present invention, there is provided a method for making ceramic material according to the third aspect of the present invention, said method comprising:
(i) combining raw materials comprising alumina particulate, a particulate material having a Mohs hardness of at least about 8.5 and a $d_{50}$ of from about 7 to about 500 μm and optionally sintering aid(s) in appropriate amounts to form a mixture thereof;
(ii) forming a green body from the mixture; and
(iii) firing the green body to form a ceramic material In certain embodiments, combining comprises milling/grinding and mixing the alumina particulate, a particulate material having a Mohs hardness of at least about 8.5 and a $d_{50}$ of from about 7 to about 500 μm, and optionally sintering aid(s), to form a homogenous mixture.

In certain embodiments, the alumina particulate is milled for a period of time before the particulate material having a Mohs hardness of at least about 8.5 and a $d_{50}$ of from about 7 to about 500 μm is added, following which further milling is carried out for a period of time sufficient to homogenize the mixture.

Grinding/milling and mixing may be performed with any suitable apparatus, such as, for example, a mixer, or mill, for example, a ball mill, in dry conditions or in a liquid medium In certain embodiments, the alumina particulate is milled for a period of time before the particulate material having a Mohs hardness of at least about 8.5 and a $d_{50}$ of from about 7 to about 500 μm is added, following which further milling is carried out for a period of time sufficient to homogenize the mixture.

In an embodiment, mixing comprises milling, for example, ball milling the calcined alumina, first particulate material having a Mohs hardness of at least about 8.5 and a $d_{50}$ of from about 7 μm to about 500 μm (and optionally the sintering additives) in said dry conditions or liquid medium to form a homogenous mixture. In an embodiment, the total milling time is less than about 5 hours, for example, less than about 4 hours, or less than about 3 hours, or less than about 2 hours, or less than about 1 hour, or less than about 45 minutes. Typically, the total milling time is greater than about 10 minutes. The calcined alumina particulate may be milled for a period of time before the addition of first particulate material, following which milling is carried out for a period of time sufficient to homogenize the mixture but without significantly reducing the particle size of the first particulate material. By 'not significantly reduced' is meant that the $d_{50}$ of the first particulate material is reduced by less than about 10%, for example, by less than about 5%, or less than about 1%. In an embodiment, the particle size and morphology of the first particulate material is not altered during milling. Typically, the first particulate material is mixed for a period of time no greater than about 45 mins, for example, no greater than about 40 minutes, or no greater than about 35 minutes, or no greater than about 30 mins. A person of skill in the art will be able to determine suitable conditions through routine experimentation to control the mixing/milling process such that the particle size and morphology of the first particulate material is not altered.

If the milling is carried out in a liquid medium, the later may be any suitable liquid medium used in the art to homogenize ceramic precursor compositions. In embodiment, the liquid medium is an aqueous solution, for example, water. In another embodiment, the liquid medium is an organic solution.

The liquid medium may be partially or completely eliminated from the mixture at the end of milling. In one advantageous embodiment, the liquid medium is removed by spray-drying to prepare a powder, for example, a ready-to-press powder. Other dryers include tunnel dryers and periodic dryers.

The resulting mixture is then shaped into green body by any known ceramic forming process. Forming is making the mixed material into a green body of any desirable form or shape, e.g., a plate, panel or brick, cylinder, sphere, or a complex shape It may involve any one of conventional processes such as extrusion, slip-casting, pressure-casting, throwing, tape-casting, injection molding, or pressing, including dry pressing, isostatic pressing, or hot isostatic pressing.

The prepared ceramic body is then dried and fired at a suitable temperature for a suitable time to result a fired ceramic body having sufficient density and a specific microstructure including larger and irregular shaped grains in a matrix of smaller grains, as described above. The drying and firing conditions will vary depending the ceramic processing conditions composition, forming, size of green body and nature of equipments.

The firing may be conducted at a temperature of at least 1200° C., for example, at a temperature of at least 1250° C., or at least about 1300° C., or at least about 1350° C., or at least about 1400° C., or at least about 1450° C., or at least about 1500° C., or at least about 1550° C., or at least about 1600° C. The firing temperature may be less than about 1900° C., for example, less than about 1800° C., or less than about 1700° C., or less than about 1650° C.

In an embodiment, firing is conducted over a firing cycle in which the temperature is raised, optionally from about room temperature, e.g., about 20° C., to a maximum firing temperature over a period of less than about 70 hours, for example, less than about 65 hours, or less than about 60 hours, or less than about 55 hours, or between about 30 and 50 hours, for example, between about 35 and 50 hours, or between about 40 and 50 hours, held at the maximum firing temperature for a period of time ranging from about 1 to about 20 hours, for example between about 1 and about 10 hours, or between about 2 and 8 hours, or between about 3 and 7 hours, and then lowered to room temperature over a period of less than about 50 hours, for example, less than about 45 hours, or less than about 40 hours, or less than about 35 hours, for example, between about 15 and 30 hours, or between about 20 and 30 hours.

Embodiments of the present invention will now be described by way of illustration only, with reference to the following non-limiting examples.

EXAMPLES

Starting Materials

Properties of the calcined alumina particulate and fused corundum particulate used in the Examples are summarized in Table 3 below. SEM images of the calcined alumina particulate and fused corundum particulate are shown in FIGS. 2(a) and 2(b), respectively.

TABLE 3

| Property | Calcined alumina | Fused corundum |
|---|---|---|
| Particle size | 4 µm ($d_{50}$) | Grit No. 220 |
| $Na_2O$ (%) | 0.25 | 0.18 |
| $Fe_2O_3$ | 0.012 | 0.04 |

Two compositions were prepared: Composition A—consisting of 100 wt. % calcined alumina particulate; Composition B—95 wt. % calcined alumina particulate and 5% fused corundum particulate. To these, sintering aids magnesium hydroxide and calcium carbonate were added to a total amount 2.3%.

Figure 3:
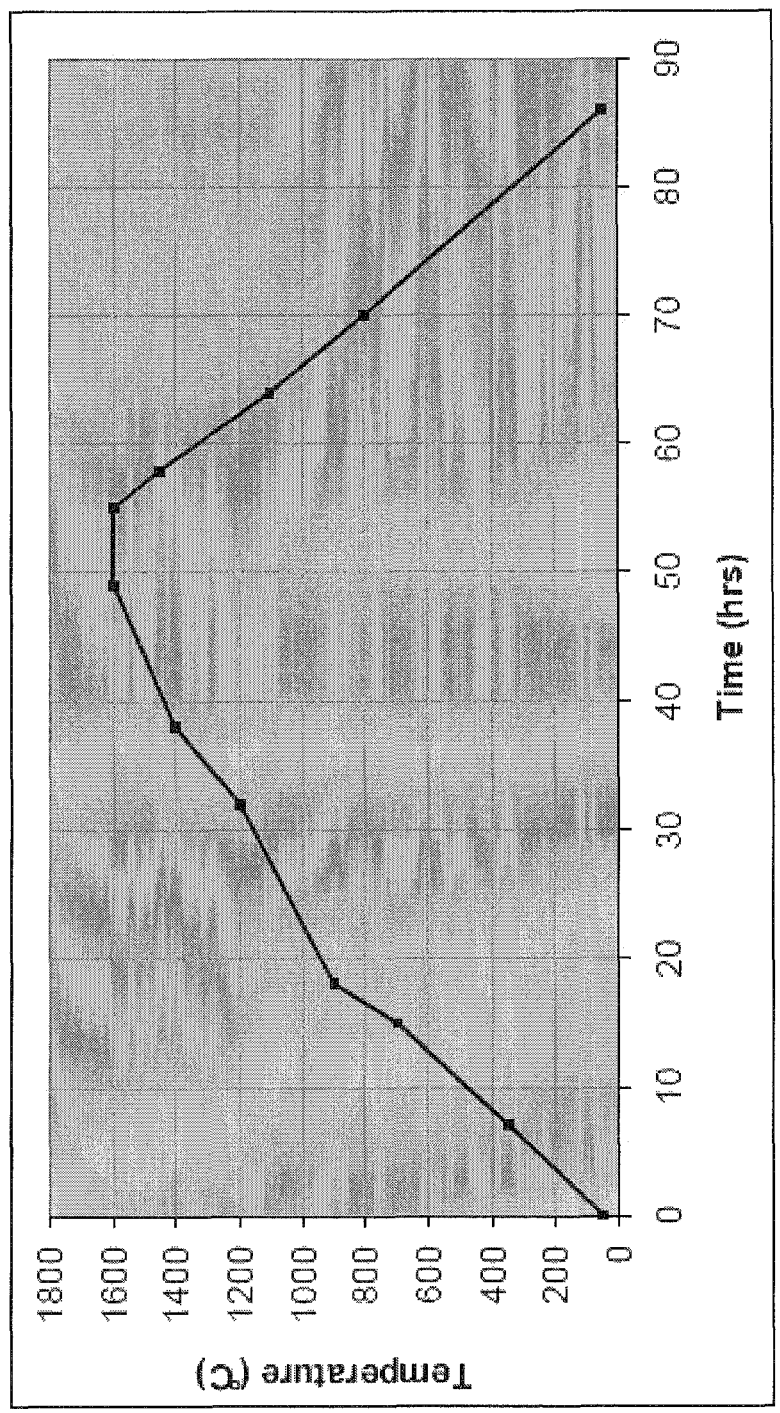
FIG. 3 is a graph showing the firing cycle for the ceramic materials prepared in the Examples.

Each composition was homogenised by milling for 12 hours by ball milling in water. The fused corundum was added in a second step and mixed with the other components in the ball mill for a 30 minutes. Ready-to-press powders were obtained by spray-drying of the liquid mixtures. The powders were pressed into green bodies of 13×13 cm plates of varying thickness (ranging from about 6.5 mm to about 7.5 mm) and fired in an industrial furnace with a firing cycle as shown in FIG. 3.

Figures 4, 4A, 4B:
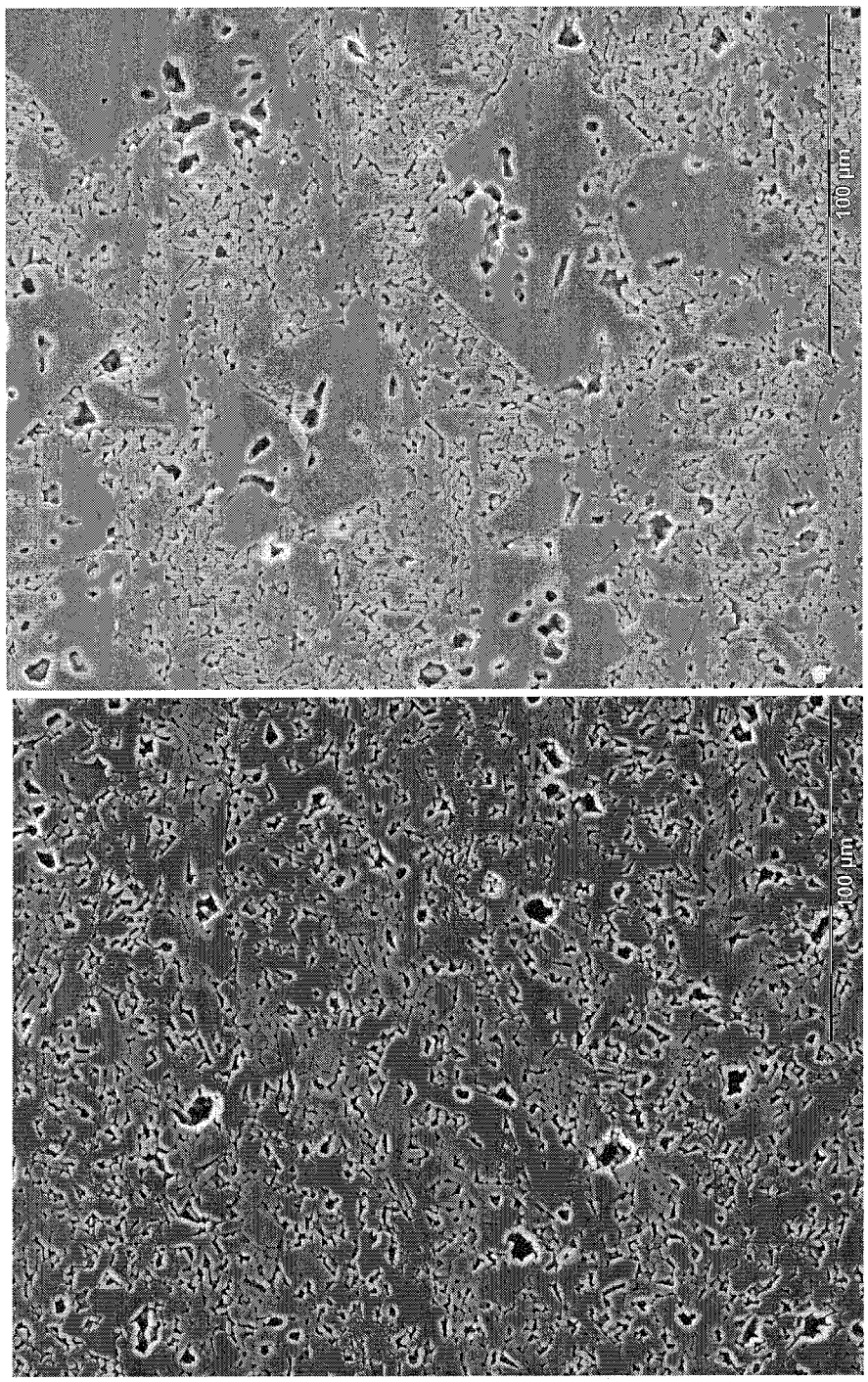
FIG. 4 is SEM images of the ceramic materials prepared in the Examples.
FIG. 4(a) is a ceramic prepared without fused corundum.
FIG. 4(b) is a ceramic prepared with fused corundum.

The mechanical properties of two plates of comparable thickness are summarized in Table 4. Plate 1 is made from Composition A; Plate 2 is made from Composition B. SEM images of Plate 1 (FIG. 4(a)) and Plate 2 (FIG. 4(b)) are shown in FIG. 4. Surprising, the hardness of Plate 2 is greater than Plate 1, despite the larger grains in Plate 2.

TABLE 4

| Property | Plate 1 | Plate 2 |
|---|---|---|
| Density (g/cm³) | 3.786 | 3.781 |
| Porosity (open, %) | 0.307 | 0.375 |
| 3-point bending strength (MPa) | 310 | 282 |
| Hardness (Knoop, kg/cm²) | 1763 | 1912 |
| Modulus of elasticity (GPa) | 333 | 335 |

Density (BD)

The density was measured using the well known Archimedes Method. Samples weighing about 10 g were dried in an oven until the mass was constant. The samples were allowed to cool in a desiccator and then weighed ($W_d$). The samples were put in a chamber under vacuum for 20 minutes. Afterwards, the chamber was filled with water at 20° C. to cover the samples which were then left submersed for 2 hours. The samples were weighed while immersed in water ($W_i$). Afterwards, the excess water was carefully dried off and the samples were immediately weighed ($W_h$). The values of dried weight ($W_d$), immersed weight ($W_i$), humid weight ($W_h$) and the water density ($d_w$) at the measurement temperature were used in order to calculate the density.

Flexural (Bending) Strength

Five fired rectangular samples of the multilayer ceramic structure having dimensions of 100 mm (length)×20 mm (width)×5 mm (thickness) had their flexural strength measured through a three-point bending test using a Zwick RoelI Z030. The support span (L) was 50 mm and the loading rate applied was 0.5 mm/min. After breaking, the width and the thickness of the specimens were measured as close as possible to the breaking point. These values, together with the break force and the support span were used to calculate the bending strength. Young's modulus was also calculated from recorded stress strain values.

Open Porosity (OP)

The open porosity was measured using the well known Archimedes Method. Samples weighing about 10 g were dried in an oven until the mass was constant. The samples were allowed to cool in a desiccator and then weighed ($W_d$). The samples were then put in a chamber under vacuum for 20 minutes, after which the chamber was filled with water at 20° C. to cover the samples which were left submersed for 2 hours. The samples were weighed while immersed in water ($W_i$). The samples were removed and the excess water was carefully dried off and the samples were immediately weighed ($W_h$). The values of dried weight ($W_d$), immersed weight ($W_i$) and humid weight ($W_h$) were used to calculate the open porosity.

$$OP = \frac{W_h - W_d}{W_h - W_i} \times 100$$

Ballistic Testing

Figure 5:
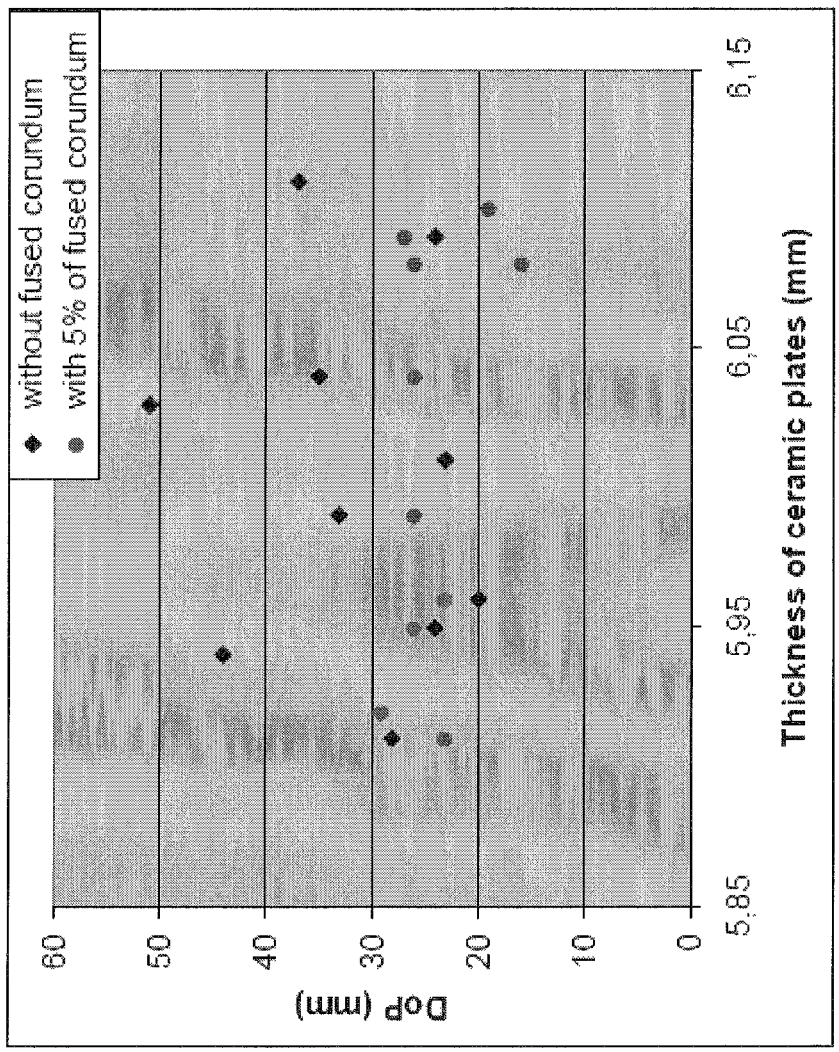
FIG. 5 is a graph summarizing the effects of fused corundum on ballistic performance of alumina based ceramics.

Depth of Penetration (DoP) tests were performed to measure the ballistic performance of ceramic plates of both compositions. In the DoP test, ballistic efficiency of a ceramic armour increases with a decrease in the DoP value. The results are summarized in FIG. 5 in which the DoP of a series of ceramic plates (as prepared above) are evaluated with regard to their thickness. The following observations are made: (i) in a frame of 3% of variation in thickness, the DoP of ceramic plates including 5 wt. % fused corundum particulate was almost independent of plate thickness; (ii) the average DoP of plates including fused corundum particulate was lower than that of plates made from only calcined alumina particulate pure ones (22 mm vs. 31 mm); (iii) the deviation of DoP was less for plates including fused corundum particulate compared to plates made only from calcined alumina particulate Therefore, it is seen that the addition of fused corundum particulate improves the ballistic performance of alumina based ceramics. Thus, the inclusion of fused corundum particulate appears to have a positive effect on both steps of projectile-ceramic armour interaction: i) during the impact step, the higher hardness of alumina with fused corundum (despite the larger grain size) helps to destroy the head of the projectile and consequently decreases the final DoP; and ii) in the penetration step, the microstructure (i.e., larger, irregular shaped grains surrounded by smaller grains) of alumina with fused corundum increases abrasive fractured ceramics which contributes to decreasing the weight and velocity of the projectile.

The invention claimed is:

1. A composition suitable for firing to form a ceramic material therefrom, said composition comprising:
   from about 1 to about 40 wt. % based on the total dry weight of the composition of a first particulate material having a Mohs hardness of at least about 8.5 and a $d_{50}$ of from about 7 µm to about 500 µm, said first particulate material being fused corundum;
   at least about 50 wt. % based on the total dry weight of the composition of a second particulate material, said second material being calcined alumina other than fused corundum; and
   from 0 to about 10 wt. % based on the total dry weight of the composition of a sintering aid.

2. The composition according to claim 1, further comprising:
   zirconia, silicon carbide, boron carbide, tungsten carbide, titanium carbide, boron nitride, diamond, or combinations thereof.

3. The composition according to claim 1, wherein the second particulate material has a $d_{50}$ of from about 1 to about 20 µm.

4. The composition according to claim 1, wherein the second particulate material has a $d_{50}$ of from about 2 to about 10 µm.

5. The composition according to claim 1, wherein the first particulate material has a $d_{50}$ of 250 µm or less.

6. The composition according to claim 1, wherein the first particulate material has an angular and/or pointed grain shape, and having a bulk density of from about 1.35 g/cm³ to about 1.60 g/cm³.

7. The composition according to claim 1, wherein the first particulate material is fused corundum having an $Al_2O_3$ content of at least about 99%, a $Fe_2O_3$ content of less than about 0.05%, and a $Na_2O$ content of less than about 0.20%.

8. The composition according to claim 1, wherein the second particulate material has an $Al_2O_3$ content greater than 99% with a $Fe_2O_3$ content of less than about 0.015, and a $Na_2O$ content of less than about 0.4%.

9. The composition according to claim 1, wherein the sintering aid is selected from an alkaline metal oxide or alkali earth metal oxide or a mixture thereof.

10. A method of making ceramic material, the method comprising:
    combining raw materials to form a composition, the raw materials comprising at least about 50 wt. % based on the total dry weight of the composition calcined alumina particulate, from about 1 to 40 wt. % based on the total dry weight of the composition of fused corundum having a Mohs hardness of at least about 8.5 and a $d_{50}$ of from about 7 to about 500 µm and at least one sintering aid to form a mixture thereof;
    forming a green body from the mixture; and
    firing the green body to form a ceramic material.

11. The method of claim 10, wherein in (i) combining comprises milling and mixing the calcined alumina particulate, the fused corundum and having a Mohs hardness of at least about 8.5 and a $d_{50}$ of from about 7 to about 500 µm, and the at least one sintering aid to form a homogenous mixture.

12. The method of claim 10, wherein the calcined alumina particulate is milled for a period of time before the fused corundum and having a Mohs hardness of at least about 8.5 and a $d_{50}$ of from about 7 to about 500 µm is added, following which further milling is carried out to homogenize the mixture.

13. The method of claim 10, wherein the raw materials comprise fused corundum having a $d_{50}$ ranging from about 7 µm to about 250 µm (Grit No. of from 800 to 60).

* * * * *